(12) United States Patent
Denney et al.

(10) Patent No.: US 7,991,010 B2
(45) Date of Patent: Aug. 2, 2011

(54) HIGHLY INTEGRATED MEDIA ACCESS CONTROL

(75) Inventors: Lisa Voigt Denney, Suwanee, GA (US); Hooman Moshar, Fountain Valley, CA (US); John Daniel Horton, Jr., Alpharetta, GA (US); Shane Patrick Lansing, Mission Viejo, CA (US); Sean Francis Nazareth, Irvine, CA (US); Niki Roberta Pantelias, Duluth, GA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/763,372

(22) Filed: Apr. 20, 2010

(65) Prior Publication Data
US 2010/0202457 A1    Aug. 12, 2010

Related U.S. Application Data

(63) Continuation of application No. 10/254,764, filed on Sep. 26, 2002, now Pat. No. 7,715,437.

(60) Provisional application No. 60/324,939, filed on Sep. 27, 2001.

(51) Int. Cl.
*H04J 3/24* (2006.01)
(52) U.S. Cl. .................. 370/474; 370/392; 370/465
(58) Field of Classification Search .............. 370/230, 370/235, 389, 392, 470, 471, 472, 474, 476, 370/465–466
See application file for complete search history.

(56) References Cited

U.S. PATENT DOCUMENTS

| 4,006,420 A | 2/1977 | Schittko |
| 4,162,452 A | 7/1979 | Ash |
| 4,340,975 A | 7/1982 | Onishi et al. |
| 4,352,209 A | 9/1982 | Ma |
| 4,408,347 A | 10/1983 | Ash |
| 4,408,349 A | 10/1983 | Yukawa |
| 4,496,979 A | 1/1985 | Yu et al. |
| 4,555,809 A | 11/1985 | Carlson |
| 4,855,835 A | 8/1989 | Tobita |

(Continued)

FOREIGN PATENT DOCUMENTS
EP    0 473 373 A2    3/1992
(Continued)

OTHER PUBLICATIONS

"BCM3350 QAMLink Advanced Set-Top Box Single-Chip Front-End" [online], BCM3250 Product Brief, Broadcom Corporation (2002) [retrieved on Oct. 11, 2002]. Retrieved from the Internet: <URL:http://www.broadcom.com/products/3250.html> (2 pages).

(Continued)

*Primary Examiner* — Chi H. Pham
*Assistant Examiner* — Kevin Mew
(74) *Attorney, Agent, or Firm* — Sterne, Kessler, Goldstein & Fox P.L.L.C.

(57) ABSTRACT

A supervisory communications device, such as a headend device within a communications network, monitors and controls communications with a plurality of remote communications devices throughout a widely distributed network. The supervisory device allocates bandwidth on the upstream channels by sending MAP messages over its downstream channel. A highly integrated media access controller integrated circuit (MAC IC) operates within the headend to provide lower level processing on signals exchanged with the remote devices. The enhanced functionality of the MAC IC relieves the processing burden on the headend CPU and increases packet throughput. The enhanced functionality includes header suppression and expansion, DES encryption and decryption, fragment reassembly, concatenation, and DMA operations

18 Claims, 13 Drawing Sheets

U.S. PATENT DOCUMENTS

| | | | |
|---|---|---|---|
| 4,858,159 | A | 8/1989 | Wheelwright et al. |
| 5,020,147 | A | 5/1991 | Okanobu |
| 5,200,826 | A | 4/1993 | Seong |
| 5,321,852 | A | 6/1994 | Seong |
| 5,564,098 | A | 10/1996 | Rodal et al. |
| 5,568,512 | A | 10/1996 | Rotzoll |
| 5,584,066 | A | 12/1996 | Okanobu |
| 5,625,307 | A | 4/1997 | Scheinberg |
| 5,625,325 | A | 4/1997 | Rotzoll et al. |
| 5,692,279 | A | 12/1997 | Mang et al. |
| 5,734,589 | A | 3/1998 | Kostreski et al. |
| 5,737,035 | A | 4/1998 | Rotzoll |
| 5,739,730 | A | 4/1998 | Rotzoll |
| 5,742,208 | A | 4/1998 | Blazo |
| 5,757,220 | A | 5/1998 | Murden et al. |
| 5,790,946 | A | 8/1998 | Rotzoll |
| 5,818,935 | A | 10/1998 | Maa |
| 5,822,687 | A | 10/1998 | Bickley et al. |
| 5,847,612 | A | 12/1998 | Birleson |
| 5,856,975 | A | 1/1999 | Rostoker et al. |
| 5,930,696 | A | 7/1999 | Tzuang et al. |
| 6,011,962 | A | 1/2000 | Lindenmeier et al. |
| 6,041,056 | A | 3/2000 | Bigham et al. |
| 6,154,640 | A | 11/2000 | Itoh et al. |
| 6,163,684 | A | 12/2000 | Birleson |
| 6,177,964 | B1 | 1/2001 | Birleson et al. |
| 6,370,603 | B1 | 4/2002 | Silverman et al. |
| 6,377,315 | B1 | 4/2002 | Carr et al. |
| 6,414,555 | B2 | 7/2002 | Staszewski et al. |
| 6,438,123 | B1 | 8/2002 | Chapman |
| 6,484,042 | B1 | 11/2002 | Loke |
| 6,522,177 | B1 | 2/2003 | Spampinato |
| 6,535,510 | B2 | 3/2003 | Kalkunte et al. |
| 6,674,998 | B2 | 1/2004 | Prentice |
| 6,693,980 | B1 | 2/2004 | Linder et al. |
| 6,757,909 | B1 | 6/2004 | Maruo et al. |
| 6,778,611 | B1 | 8/2004 | Ungerboeck |
| 6,807,193 | B1 | 10/2004 | Beser |
| 6,816,548 | B1 | 11/2004 | Shiue et al. |
| 6,886,180 | B1 | 4/2005 | Sandberg et al. |
| 6,914,883 | B2 | 7/2005 | Dharanikota |
| 6,941,576 | B2 | 9/2005 | Amit |
| 6,993,016 | B1 | 1/2006 | Liva et al. |
| 7,006,318 | B2 | 2/2006 | Stence et al. |
| 7,007,929 | B2 | 3/2006 | Kwon |
| 7,017,176 | B1 | 3/2006 | Lee et al. |
| 7,113,484 | B1 | 9/2006 | Chapman et al. |
| 7,136,381 | B2 | 11/2006 | Battle et al. |
| 7,146,007 | B1 | 12/2006 | Maruo et al. |
| 7,236,760 | B2 | 6/2007 | Cowley et al. |
| 7,265,792 | B2 | 9/2007 | Favrat et al. |
| 7,327,726 | B2 | 2/2008 | Kye |
| 7,342,614 | B2 | 3/2008 | Mehr et al. |
| 7,379,472 | B2 | 5/2008 | Pantelias et al. |
| 7,433,352 | B2* | 10/2008 | Horton et al. .................. 370/389 |
| 7,548,742 | B2 | 6/2009 | Johnson |
| 7,554,978 | B1 | 6/2009 | Parker |
| 7,573,847 | B2 | 8/2009 | Rogers et al. |
| 7,649,879 | B2 | 1/2010 | Parker |
| 7,690,006 | B2 | 3/2010 | Birnbaum et al. |
| 7,715,437 | B2* | 5/2010 | Denney et al. ................. 370/474 |
| 2002/0061012 | A1 | 5/2002 | Thi et al. |
| 2002/0065907 | A1 | 5/2002 | Cloonan et al. |
| 2002/0073431 | A1 | 6/2002 | Nikolich |
| 2002/0093955 | A1* | 7/2002 | Grand et al. .................. 370/389 |
| 2002/0093970 | A1 | 7/2002 | Amit |
| 2002/0106018 | A1 | 8/2002 | D'Luna et al. |
| 2002/0131426 | A1 | 9/2002 | Amit et al. |
| 2002/0176416 | A1 | 11/2002 | Ben-Ze'ev et al. |
| 2003/0061623 | A1 | 3/2003 | Denney et al. |
| 2004/0028151 | A1 | 2/2004 | Arambepola et al. |
| 2004/0230997 | A1 | 11/2004 | Kaylani |
| 2005/0071882 | A1 | 3/2005 | Rodriguez et al. |
| 2005/0177713 | A1* | 8/2005 | Sim .............................. 713/151 |
| 2005/0226242 | A1 | 10/2005 | Parker |
| 2005/0259186 | A1 | 11/2005 | Mehr et al. |
| 2006/0013240 | A1* | 1/2006 | Ma et al. ....................... 370/401 |
| 2006/0026657 | A1 | 2/2006 | Kuhlmann et al. |
| 2006/0026659 | A1 | 2/2006 | McMullin et al. |
| 2006/0064583 | A1 | 3/2006 | Birnbaum et al. |
| 2006/0114899 | A1* | 6/2006 | Toumura et al. ............... 370/389 |
| 2006/0123457 | A1 | 6/2006 | Chen et al. |
| 2007/0030806 | A1 | 2/2007 | Pantelias et al. |
| 2007/0214482 | A1 | 9/2007 | Nguyen |
| 2007/0291784 | A1 | 12/2007 | Chan et al. |
| 2007/0294738 | A1 | 12/2007 | Kuo et al. |
| 2008/0020797 | A1 | 1/2008 | Denney et al. |
| 2008/0046952 | A1* | 2/2008 | Denney et al. ................. 725/125 |
| 2008/0304490 | A1* | 12/2008 | Bunn et al. ................ 370/395.52 |
| 2010/0135329 | A1* | 6/2010 | Horton et al. .................. 370/476 |

FOREIGN PATENT DOCUMENTS

| | | |
|---|---|---|
| WO | WO0076265 | 12/2000 |
| WO | WO0117168 | 3/2001 |
| WO | WO 01/74079 A1 | 10/2001 |
| WO | WO 02/47383 A1 | 6/2002 |

OTHER PUBLICATIONS

"BCM3250 QAMLink Advanced Set-Top Box Single-Chip Front-End" [online], Broadcom Product Site Guide [retrieved on Oct. 11, 2002]. Retrieved from the Internet: <URL:http://www.broadcom.com/products/3250.html> (2 pages).

"BCM3345 High-Performance Single-Chip DOCSIS/EURODOCSIS Cable Modem" [online], Broadcom Product Site Guide [retrieved on Oct. 11, 2002]. Retrieved from the Internet: <URL:http: //www.broadcom.comlproducts/3345.html> (2 pages).

"BCM3345 High-Performance Single-Chip DOCSIS/EURODOCSIS Cable Modem" [online], BCM3345 Product Brief, Broadcom Corporation (2002) [retrieved on Oct. 11, 2002]. Retrieved from the Internet: <URL: http://www.broadcom.comlproducts/3345.htm1> (2 pages).

"BCM3350 QAMlink Single-Chip Cable Modem" [online], Broadcom Products Site Guide [retrieved on Oct. 11, 2002]. Retrieved from the Internet: <URL: http://www.broadcom.comlproducts/3350.html> (2 pages).

"BCM3350 QAMlink Single-Chip Cable Modem" [online], BCM 3350 Product Brief, Broadcom Corporation (2001) [retrieved on Oct. 11, 2002]. Retrieved from the Internet: <URL: http://www.broadcom.com/products/3350.html>(2 pages).

"BCM 7110 Single-Chip Set-Top Box with DOCSIS 1.1 and PVR" [online], Product Brief, Broadcom Corporation (2002) [retrieved on Aug. 22, 2002]. Retrieved from the Internet:<URL:http://www.broadcom.com/products/7110.html> (2 pages).

"BCM 7110 Single-Chip Set-Top Box with DOCSIS 1.1 and PVR" [online], Broadcom Products Site Guide [retrieved on Aug. 22, 2002]. Retrieved from the Internet<URL:http://www.broadcom.com/products/7110.html> (2 pages).

"Data-Over-Cable Service Interface Specifications: DOCSIS Set-top Gateway (DSG) Interface Specification", 2001-2007 Cable Television Laboratories, Inc. (CableLabs), DCN: CM-SP-DSG-IIO-070223, Last Revised: Feb. 23, 2007, 111 pgs.

"DOCSIS® 2.0+ Channel Bonded IP Video Set-Top: Front End IC" 2005 Broadcom Corporation, DCN: 3255-DSOI-R, Last Revised: Dec. 2, 2005, 488 pgs.

"High-Definition Video UMA Subsystem with 2D Graphics" [online], BCM7020R Products Brief, Broadcom Corporation (2002) [retrieved on Oct. 11, 2002]. Retrieved from the Internet: <URL: http://www.broadcom.com/products/7020.html> (2 pages).

"High-Definition Video UMA Subsystem with 2D Graphics" [online], Broadcom Product Site Guide [retrieved on Oct. 11, 2002]. Retrieved from the Internet: <URL: http://www.broadcom.com/products/7020.html> (2 pages).

"Preliminary Hardware Data Module: BCM7401 A0", 2006 Broadcom Corporation, DCN: 7401-1HDM07-R, Last Revised: Mar. 1, 2006, 164 pgs.

European Search Report for European Patent Appl. No. 04011414.2, issued Aug. 6, 2004, 4 pages.

European Search Report for European Patent Appl. No. 02789170.4, issued Jul. 22, 2009, 5 pages.

International Search Report for International Application No. PCT/US02/30522, issued on Mar. 11, 2003.

Droitcourt, J.L., "Understanding How Interactive Television Set Top Box Works...And What It Will Mean to the Customer," International Broadcasting Convention (Sep. 14-18, 1995, London, England), Conference Publication No. 413, pp. 382-394, IEE (1995).

"Broadcom Touts Single-Chip Set-Top Box". Michael Singer. May 21, 2002. http://www.technewsplanet.com/infra/article.php/1142411.

Conexant's "Single-Chip DBS Set-Top Box System Solution—CX24152/5" Published 2003, Set-Top Box Solutions.

Ducourant et al., "A 3 Chip G&As Double Conversion TV Tuner System With 70 dB Image Rejection," IEEE 1989 Microwave and Millimeter-Wave Monolithic Circuits Symposium, pp. 87-90.

Farmer, "Specifications for Tuner Design for Use in Cable Ready Television Receivers and VCRs," IEEE Transactions on Consumer Electronics, vol. 36, No. 3, Aug. 1990, pp. 660-668.

Maas, "Microwave Mixers," Artech House, Copyright, 1986, pp. 248-251.

* cited by examiner

HIGHLY INTEGRATED MEDIA ACCESS CONTROL

CROSS-REFERENCE TO RELATED APPLICATIONS

This application is a continuation of U.S. patent application Ser. No. 10/254,764, filed Sep. 26, 2002, which claims the benefit of U.S. Provisional Application No. 60/324,939, filed Sep. 27, 2001, both of which are incorporated herein by reference.

The following United States and PCT utility patent applications have a common assignee and contain some common disclosure:

"Method and System for Flexible Channel Association," U.S. application Ser. No. 09/963,671, by Denney et al., filed Sep. 27, 2001, incorporated herein by reference;

"Method and System for Upstream Priority Lookup at Physical Interface," U.S. application Ser. No. 09/963,689, by Denney et al., filed Sep. 27, 2001, incorporated herein by reference;

"System and Method for Hardware Based Reassembly of Fragmented Frames," U.S. application Ser. No. 09/960,725, by Horton et al., filed Sep. 24, 2001, incorporated herein by reference;

"Method and Apparatus for the Reduction of Upstream Request Processing Latency in a Cable Modem Termination System," U.S. application Ser. No. 09/652,718, by Denney et al., filed Aug. 31, 2000, incorporated herein by reference;

"Hardware Filtering of Unsolicited Grant Service Extended Headers," U.S. Application No. 60/324,912, by Pantelias et al., filed Sep. 27, 2001, incorporated herein by reference;

"Packet Tag for Support of Remote Network Function/Packet Classification," U.S. application Ser. No. 10/032,100, by Grand et al., filed Dec. 31, 2001, incorporated herein by reference; and "Method and Apparatus for Interleaving DOCSIS Data with an MPEG Video Stream," U.S. application Ser. No. 09/963,670, by Dworkin et al., filed Sep. 27, 2001, incorporated herein by reference.

BACKGROUND OF THE INVENTION

1. Field of the Invention

The present invention relates generally to communications networking, and more specifically, to media access control processing within a communications network.

2. Related Art

In recent years, cable network providers have expanded the variety of services offered to their subscribers. Traditionally, cable providers, for instance, delivered local and network broadcast, premium and pay-for-view channels, and newscasts into a viewer's home. Some modern cable providers have augmented their portfolio of services to include telephony, messaging, electronic commerce, interactive gaming, and Internet services. As a result, system developers are being challenged to make available adequate bandwidth to support the timely delivery of these services.

Moreover, traditional cable broadcasts primarily require one-way communication from a cable service provider to a subscriber's home. However, as interactive or personal television services and other nontraditional cable services continue to strive, communications media used to support one-way communications must now contend with an increased demand for bi-directional communications. This results in a need for improved bandwidth arbitration among the subscribers' cable modems.

In a cable communications network, for example, a communications device (such as a modem) requests bandwidth from a headend device prior to transmitting data to its destination. Thus, the headend device serves as a centralized point of control for allocating bandwidth to the communications devices. Bandwidth allocation can be based on availability and/or competing demands from other communications devices. As intimated above, bandwidth typically is available to transmit signals downstream to the communications device. However in the upstream, bandwidth is more limited and must be arbitrated among the competing communications devices.

A cable network headend includes a cable modem termination system (CMTS) which comprises a media access controller (MAC) and central processing unit (CPU). The MAC receives upstream signals from a transceiver that communicates with remotely located cable modems. The upstream signals are delivered to the CPU for protocol processing. The protocol processing is conventionally defined by the Data Over Cable Service Interface Specification (DOCSIS™) for governing cable communications. Depending on the nature of the protocol processing, the CPU must be able to handle these operations efficiently and timely as to not impede performance. As more subscribers and/or services are added to the network, greater emphasis is placed on the MAC and CPU to sustain protocol processing with no interruption in service.

Therefore, a system and method that increase packet throughput capacity and sustain performance are needed to address the above problems.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

DETAILED DESCRIPTION OF THE INVENTION

I. Introduction

Figure 1:
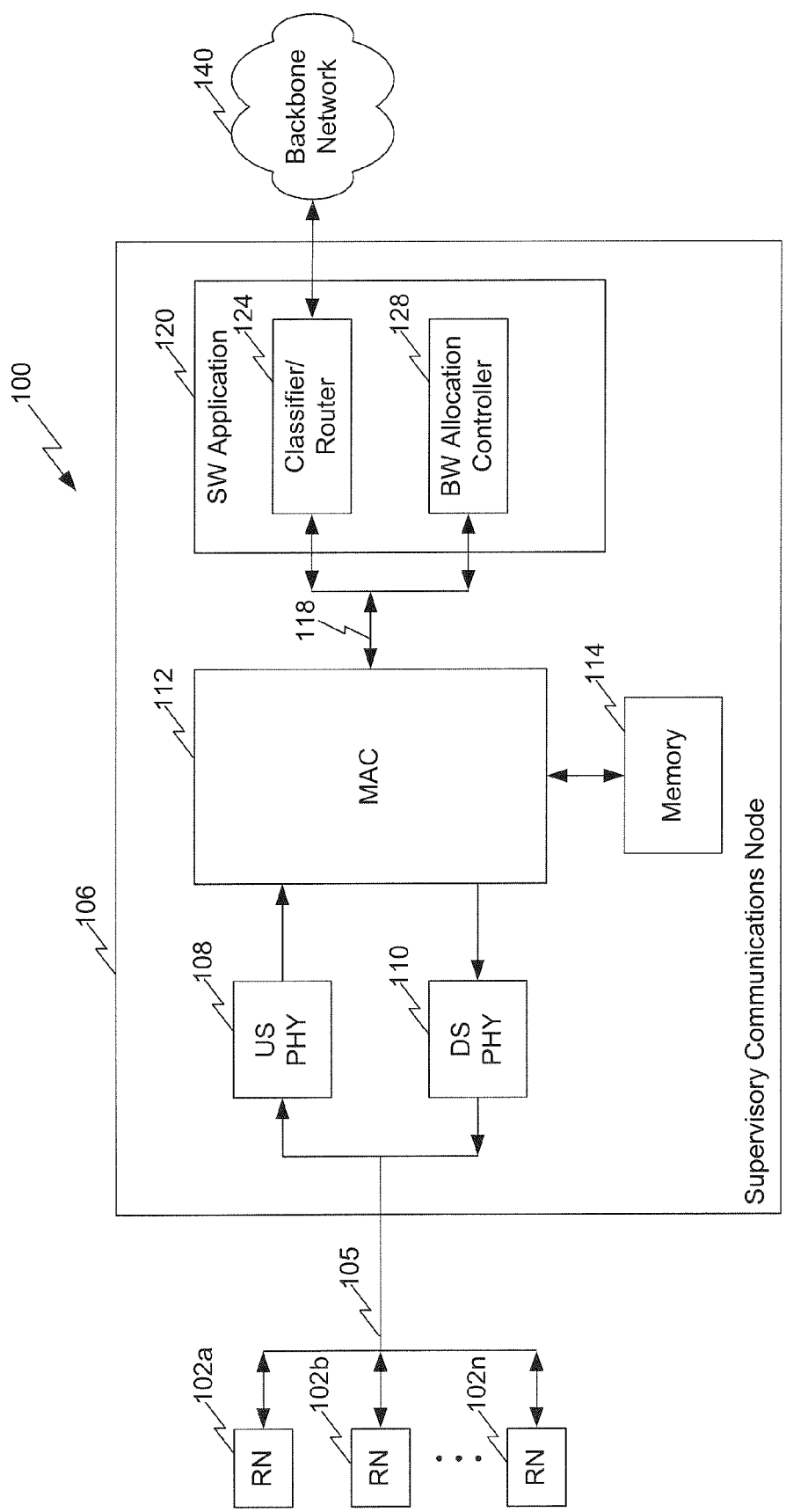
FIG. 1 illustrates a voice and data communications management system according to an embodiment of the present invention.

FIG. 1 illustrates a voice and data communications management system 100 according to an embodiment of the present invention. System 100 includes a supervisory communications node 106 and one or more widely distributed remote communications nodes 102a-102n (collectively referred to as "remote communications nodes 102"). System 100 can be implemented in any multimedia distribution network. Furthermore, it should be understood that the method and system of the present invention manage the exchange of voice, data, video, audio, messaging, graphics, other forms of media and/or multimedia, or any combination thereof.

Supervisory communications node 106 is centrally positioned to command and control interactions with and among remote communications nodes 102. In an embodiment, supervisory communications node 106 is a component of a headend controller, such as a cable modem termination system (CMTS) or a part thereof. In an embodiment, at least one remote communications node 102 is a cable modem or a part thereof. In another embodiment, supervisory communications node 106 is a CMTS and at least one remote communications node 102 is a component of a television set-top box.

As part of a cable modem, remote communications node 102 is configurable to host one or more services to a subscriber. The services include telephony, television broadcasts, pay-for-view, Internet communications (e.g., WWW), radio broadcasts, facsimile, file data transfer, electronic mailing services (email), messaging, video conferencing, live or time-delayed media feeds (such as, speeches, debates, presentations, infomercials, news reports, sporting events, concerts, etc.), or the like.

Each remote communications node 102 is assigned one or more service identifier (SID) codes that supervisory communications node 106 uses to allocate bandwidth. A SID is used primarily to identify a specific flow from a remote communications node 102. However, as apparent to one skilled in the relevant art(s), other identifiers can be assigned to distinguish between the remote communications node 102 and/or the flow of traffic therefrom. Accordingly, in an embodiment, a SID or another type of identifier is assigned to identify a specific service affiliated with one or more remote communications nodes 102. In an embodiment, a SID or another type of identifier is assigned to designate a particular service or group of services without regard to the source remote communications node 102. In an embodiment, a SID or another type of identifier is assigned to designate a quality of service (QoS), such as voice or data at decreasing levels of priority, voice lines at different compression algorithms, best effort data, or the like. In an embodiment multiple SIDs are assigned to a single remote communications node.

In an embodiment, supervisory communications node 106 and remote communications nodes 102 are integrated to support protocols such as Internet Protocol (IP), Transmission Control Protocol (TCP), User Datagram Protocol (UDP), Real Time Transport Protocol (RTP), Resource Reservation Protocol (RSVP), or the like.

Communications management system 100 also includes an internodal infrastructure 105. As shown in FIG. 1, internodal infrastructure 105 provides interconnectivity among supervisory communications node 106 and remote communications nodes 102. Internodal infrastructure 105 supports wired, wireless, or both transmission media, including satellite, terrestrial (e.g., fiber optic, copper, twisted pair, coaxial, hybrid fiber-coaxial (HFC), or the like), radio, microwave, free space optics (FSO), and/or any other form or method of transmission.

All communications transmitted in the direction from supervisory communications node 106 towards remote communications nodes 102 are referred to as being in the downstream. In an embodiment, the downstream is divided into one or more downstream channels. Each downstream channel is configured to carry various types of information to remote communications nodes 102. Such downstream information includes television signals, data packets (including IP datagrams), voice packets, control messages, and/or the like. In an embodiment, the downstream is formatted with a motion picture expert group (MPEG) transmission convergence sublayer. However, the present invention can be configured to support other data formats as would be apparent to one skilled in the relevant art. In an embodiment, supervisory communications node 106 implements time division multiplexing (TDM) to transmit continuous point-to-multipoint signals in the downstream.

The upstream represents all communications from remote communications nodes 102 towards supervisory communications node 106. In an embodiment, the upstream is divided into one or more upstream channels. Each upstream channel carries bursts of packets from remote communications nodes 102 to supervisory communications node 106. In the upstream, each frequency channel is broken into multiple assignable slots, and remote communications nodes 102 send a time division multiple access (TDMA) burst signal in an assigned slot. TDM and TDMA are described herein by way of example. It should be understood that the present invention could be configured to support other transmission modulation standards, including, but not limited to, Synchronous Code Division Multiple Access (S-CDMA), as would be apparent to one skilled in the relevant art(s).

As shown in FIG. 1, an embodiment of supervisory communications node 106 includes an upstream demodulator physical layer device (US PHY) 108, a downstream modulator physical layer device (DS PHY) 110, a media access controller (MAC) 112, a memory 114 and a software application 120. US PHY 108 forms the physical layer interface between supervisory communications node 106 and the upstream channels of internodal infrastructure 105. Hence, US PHY 108 receives and demodulates all bursts from remote communications nodes 102. In an embodiment, US PHY 108 checks the FEC field in the burst to perform error correction if required.

Conversely, DS PHY 110 forms the physical layer interface between supervisory communications node 106 and the downstream channel(s) of internodal infrastructure 105. Hence, packets (containing voice, data (including television or radio signals) and/or control messages) that are destined for one or more remote communications nodes 102 are collected at DS PHY 110 and converted to a physical signal. DS PHY 110, thereafter, transmits the signal downstream.

MAC 112 receives the upstream signals from US PHY 108 or provides the downstream signals to DS PHY 110, as appropriate. MAC 112 operates as the lower sublayer of the data link layer of supervisory communications node 106. As discussed in greater detail below, MAC 112 extracts voice, data, requests, and/or the like, and supports fragmentation, concatenation, and/or error checking for signals transported over the physical layer.

Memory 114 interacts with MAC 112 to store the signals as MAC 112 processes them. Memory 114 also stores various auxiliary data used to support the processing activities. Such auxiliary data includes security protocols, identifiers, and the like, as described in greater details below.

MAC 112 interacts with software application 120 via a conventional bi-directional bus 118. Software application 120 operates on one or more processors to receive control messages, data, and/or voice from MAC 112, and implement further processing. In embodiments, an application-specific integrated circuit (ASIC), field programmable gate array (FPGA), or a similar device provides hardware assists to enable software application 120 to support the functions of MAC 112. As shown, software application 120 includes a classifier/router 124 and a bandwidth (BW) allocation controller 128. BW allocation controller 128 manages upstream and/or downstream modulation and bandwidth allocation. Classifier/router 124 provides rules and policies for classifying and/or prioritizing communications with remote communications nodes 102. Classifier/router 124 also routes signals from remote communications nodes 102 to a destined location over backbone network 140.

Backbone network 140 is part of a wired, wireless, or combination of wired and wireless local area networks (LAN) or wide area networks (WAN), such as an organization's intranet, local internets, the global-based Internet (including the World Wide Web (WWW)), private enterprise networks, or the like. As such, supervisory communications node 106 utilizes backbone network 140 to communicate with another device or application external to communications management system 100. The device or application can be a server, web browser, operating system, other types of information processing software (such as, word processing, spreadsheets, financial management, or the like), television or radio transmitter, another remote communications node 102, another supervisory communications node 106, or the like.

II. Media Access Controller

In an embodiment, MAC 112 is an integrated circuit within a CMTS (shown in FIG. 1 as supervisory communications node 106). Accordingly, MAC 112 performs a variety of protocol processes defined by the CableLabs® Certified™ Cable Modem project, formerly known as DOCSIS™ (Data Over Cable Service Interface Specification), that defines the interface requirements for cable communications. The functions performed by MAC 112 includes interfacing with US PHY 108 and DS PHY 110, encrypting and decrypting data, storing packet data in queues, and/or DMA functions to exchange data with memory 114. Although the present invention is described in reference to DOCSIS protocol processing, it should be understood that the present invention is intended to be inclusive of other types of communication protocols governing multimedia distribution networks. However, the highly integrated MAC 112 of the present invention includes several additional functions that reduces the quantity of components within a conventional CMTS, the power consumption, the processing burden on software application 120, and/or the cost of the CMTS.

Figure 2:
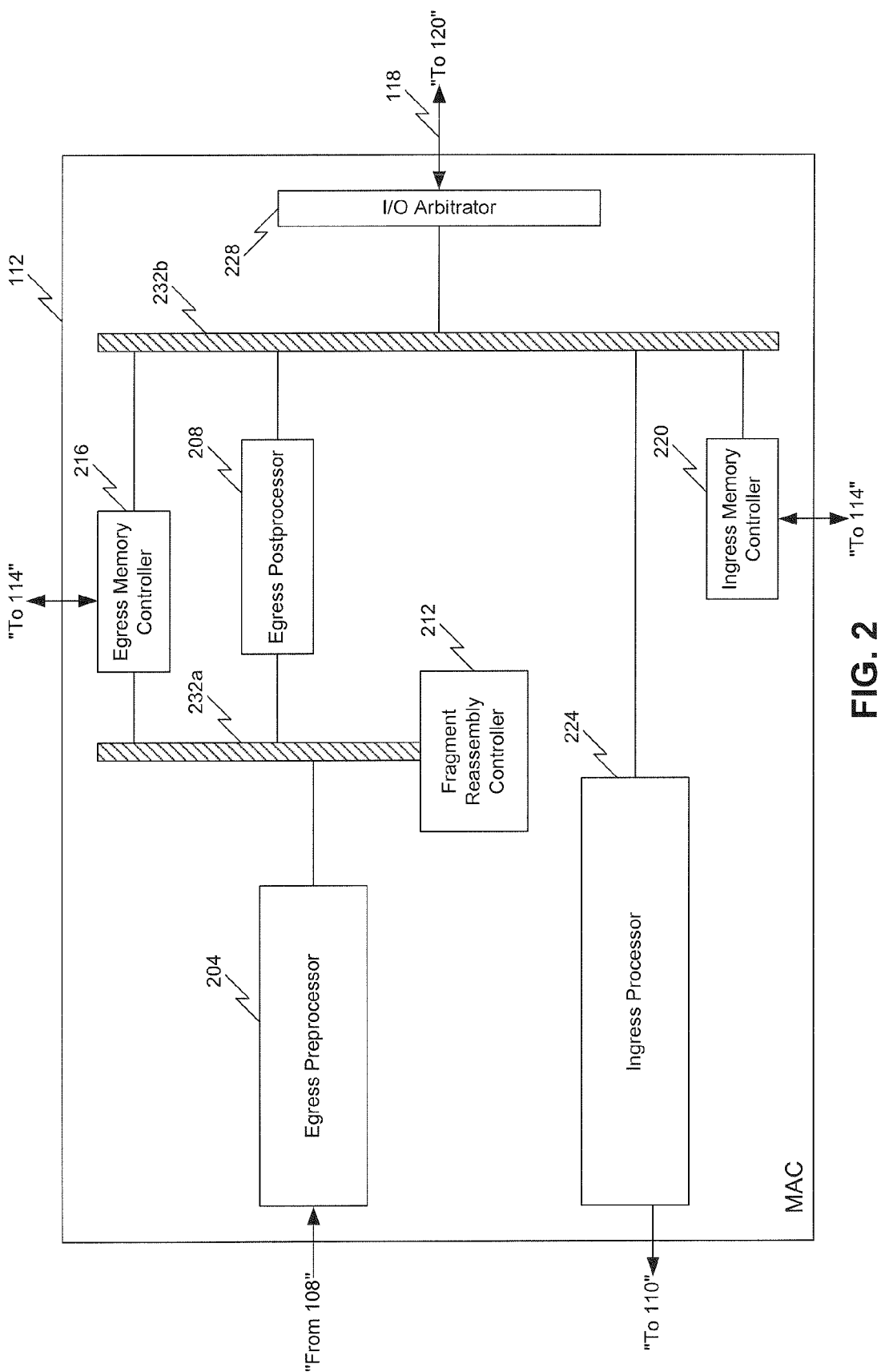
FIG. 2 illustrates a media access controller according to an embodiment of the present invention.

FIG. 2 shows the components of a highly integrated MAC 112 according to an embodiment of the present invention. MAC 112 includes an egress preprocessor 204, an egress postprocessor 208, a fragment reassembly controller 212, an egress memory controller 216, an ingress memory controller 220, an ingress processor 224, and an input/output (I/O) arbitrator 228. The components communicate over bus 232a and bus 232b (referred to collectively herein as "bus 232"). In an embodiment, bus 232 is an internal-only split transaction bus with built-in arbitration to allow the components to communicate with each other and with a shared memory interface to memory 114. It should be understood that although two buses 232 (i.e., bus 232a and bus 232b) are shown in FIG. 2, the present invention is adaptable to support more or fewer buses.

Egress preprocessor 204 receives signals (including voice, data, and/or bandwidth requests) from US PHY 108. Egress preprocessor 204 performs preliminary signal processing that includes prioritizing the signals. An example of preliminary signal prioritizing is described in the application entitled "Method and System for Upstream Priority Lookup at Physical Interface" (U.S. App No. 09/963,689), which is incorporated herein by reference as though set forth in its entirety. Egress preprocessor 204 interacts with egress memory controller 216 that sends the signals to queues located in memory 114. In an embodiment, egress preprocessor 204 does not send the signals to a queue, but rather passes the signals to fragment reassembly controller 212.

Fragment reassembly controller 212 interacts with egress preprocessor 204 to receive the signals from this component and/or with egress memory controller 216 to receive the signals from memory 114. Fragment reassembly controller 212 identifies fragmented frames from the signals and reassembles the frames according to instructions provided in the header frames of the signals. Defragmentation is primarily performed on data packets. However, defragmentation can also be performed on voice or requests, although such signals are rarely fragmented in practice. An example of fragment reassembly is described in the application entitled "System and Method for Hardware Based Reassembly of Fragmented Frames" (U.S. App No. 09/960,725), which is incorporated herein by reference as though set forth in its entirety.

In an embodiment, fragment reassembly controller 212 is programmable to terminate reassembly operations if error conditions are detected. Such error conditions include, for example, missing or out of sequence fragments. If such errors are detected, fragment reassembly controller 212 discards the affected frames. Nonetheless, upon completion of its processing operations, fragment reassembly controller 212 interacts with egress memory controller 216 to store the defragmented signals in queues within memory 114.

Egress postprocessing 208 performs additional processing on the signals stored in the queues of memory 114. The additional processing is explained in greater detail below. The operations implemented by egress postprocessing 208 typically occur after the signals have been evaluated and/or processed by fragment reassembly controller 212. Egress postprocessor 208 also interacts with egress memory controller 216 to store the post-processed signals in priority queues within memory 114. An example of storing signals in priority queues is described in the application entitled "Method and System for Upstream Priority Lookup at Physical Interface" (U.S. application Ser. No. 09/963,689), which is incorporated herein by reference as though set forth in its entirety.

Bus 232a supports the transfer of signals among egress preprocessor 204, fragment reassembly controller 212, egress postprocessor 208 and egress memory controller 216 prior to processing by egress postprocessor 208. Bus 232b however supports communication with memory controller 216 upon completion of processing by egress postprocessor 208. Bus 232b also enables signals to be delivered to I/O arbitrator 228.

I/O arbitrator 228 manages the exchange of communications between software application 120 and MAC 112. In particular, I/O arbitrator 228 interfaces with bus 118 to deliver the signals to software application 120. I/O arbitrator 228 also receives signals from software application 120. Such signals include broadcast signals and control messages to be transported downstream. These signals are typically stored in memory 114 until MAC 112 is ready to process them. As such, ingress memory controller 220 interacts, over bus 232b, with I/O arbitrator 228 to receive signals from software application 120 and store the signals in priority queues within memory 114.

Ingress processor 224 interacts with ingress memory controller 220 to received the downstream signals from memory 114. Ingress processor 224 formats and prepares the signals for delivery to DS PHY 110, as described in greater details below.

Figure 3:
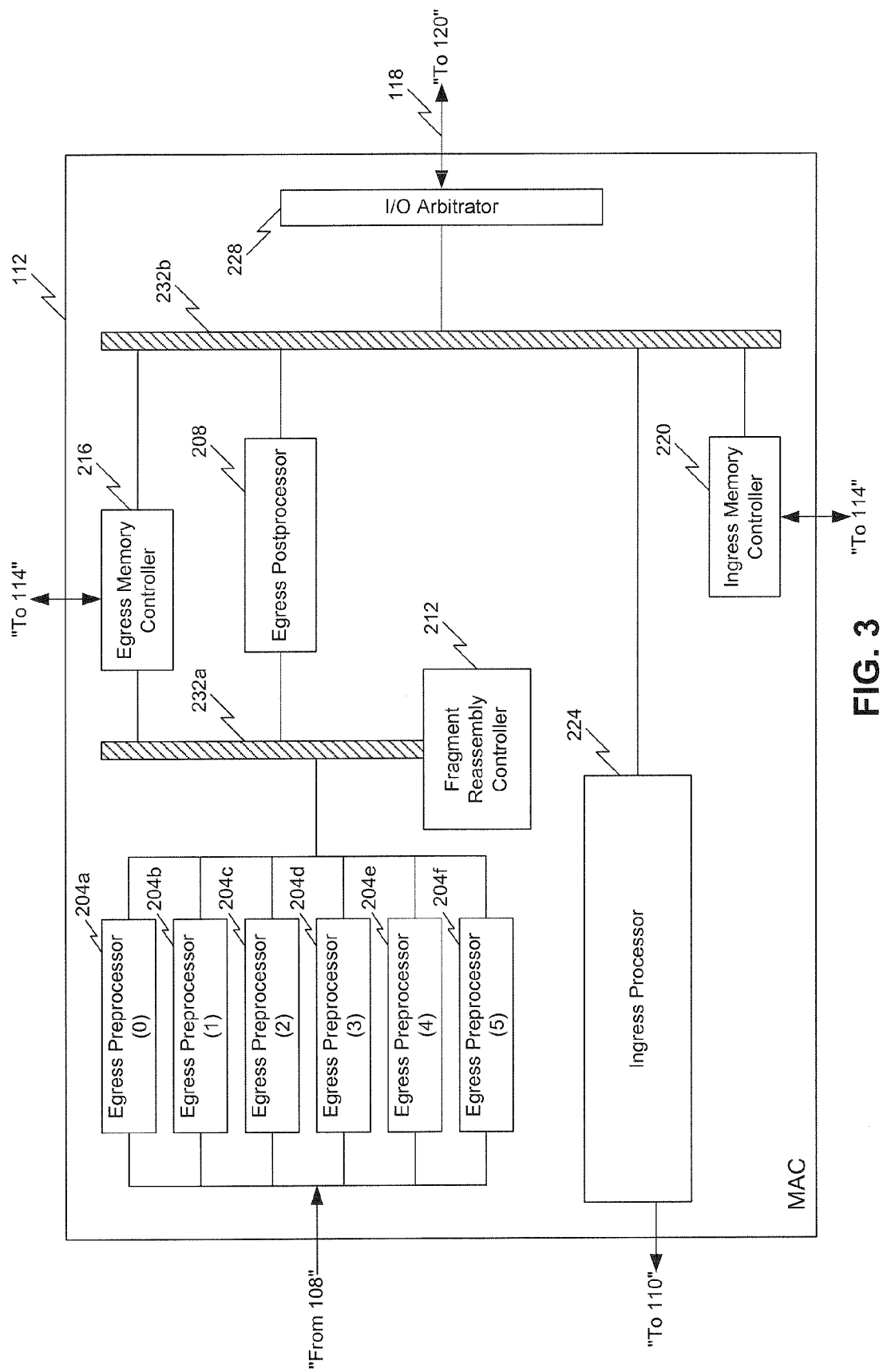
FIG. 3 illustrates a media access controller according to another embodiment of the present invention.

FIG. 3 illustrates an another embodiment of MAC 112. A separate egress preprocessor 204 (shown as egress preprocessor 204a-204f) is provided for each upstream channel of internodal interface 105. Although hardware configuration of this embodiment supports only six upstream channels, the present invention can support greater or lesser quantities of upstream channels as would be apparent to one skilled in the relevant art(s). As such, the present invention can utilize one egress preprocessor 204 to process signals from multiple upstream channels as shown in FIG. 2, utilize a plurality of single egress preprocessors 204 with each egress preprocessor 204 processing signals from a single upstream channel as shown in FIG. 3, or a combination of both.

Figure 4:
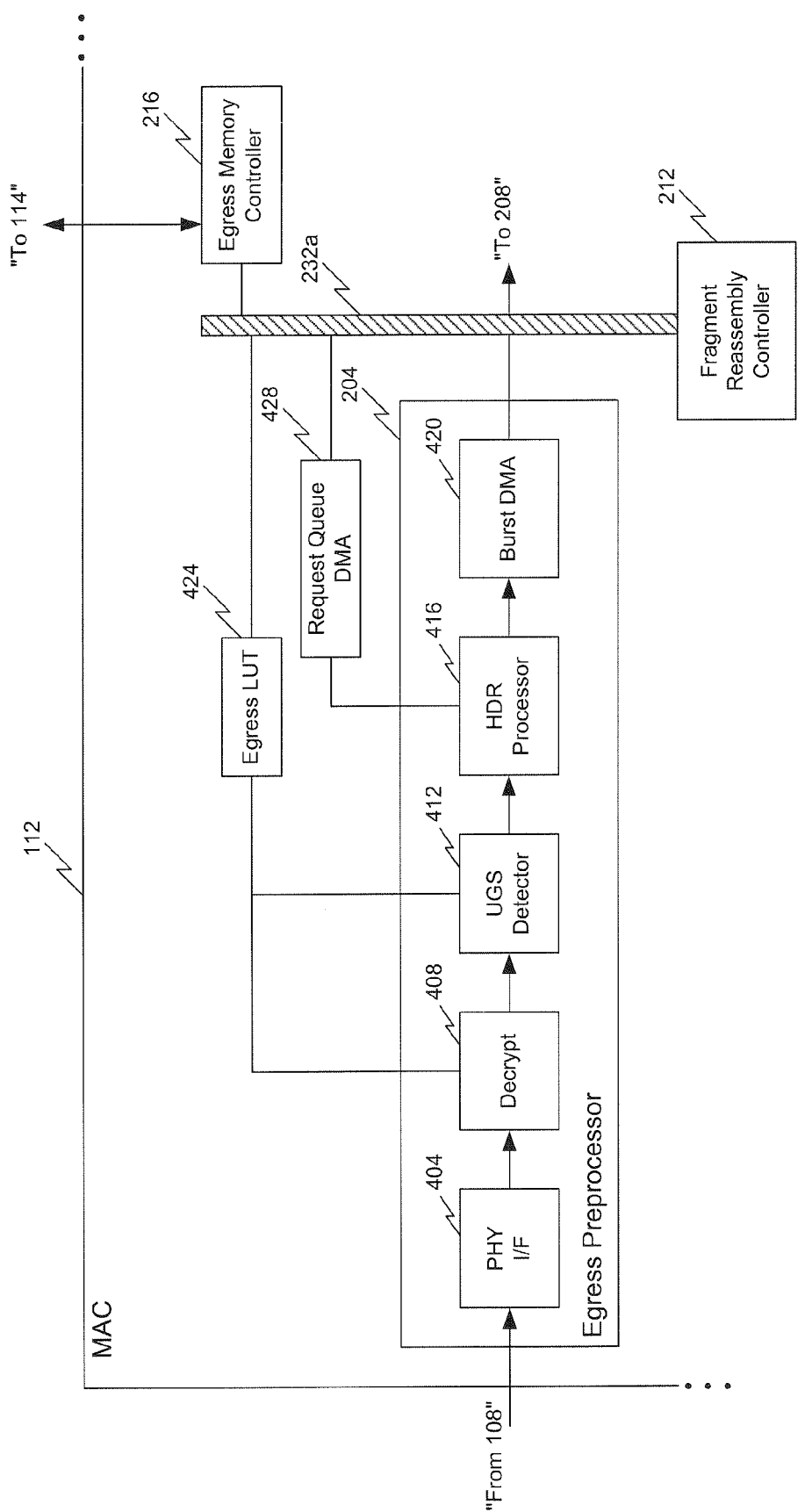
FIG. 4 illustrates a media access controller according to another embodiment of the present invention.

FIG. 4 shows the components of egress preprocessor 204 according to an embodiment of the present invention. Egress preprocessor 204 includes a PHY interface (I/F) device 404, a decryptor (decrypt) 408, an unsolicited grant synchronization (UGS) detector 412, a header (HDR) processor 416, and a burst direct memory access (DMA) 420.

PHY I/F 404 receives signals (i.e., voice, data and/or requests) from US PHY 108. In an embodiment, PHY I/F 404 prioritizes the signals based on source and/or service. This is implemented by utilizing the SID and/or some other type of node or flow identifier. In an embodiment, PHY I/F 404 checks the header checksum (HCS) field in the burst to perforin error detection, if required. In another embodiment, PHY I/F 404 checks the cyclic redundancy check (CRC) field in the burst for error detection.

Decrypt 408 receives signals from PHY I/F 404 and performs decryption. In an embodiment, decrypt 408 performs data encryption standard (DES) decryption. In another embodiment, decrypt 408 performs advanced encryption standard (AES) decryption. Other decryption standards can be used, including but not limited to public-key encryption, as would be apparent to one skilled in the relevant art(s).

Depending on the security protocol that is being deployed, decrypt 408 extracts intelligence information from the signal, and processes the intelligence information for decrypting the signal. In an embodiment, a baseline privacy interface (BPI) protocol is used to encrypt upstream bursts. Similarly, a BPI protocol secures downstream bursts to restrict access to authorized subscribers. However, other security protocols can be used, including but not limited to, security system interface (SSI), removable security module interface (RSMI), or the like.

As such, in an embodiment, decrypt 408 checks a BPI field in each signal to detect whether the BPI field is enabled. If the BPI field is disabled, the signal passes to UGS detector 412 and HDR processor 416. Otherwise, decrypt 408 requests and receives key information from egress lookup controller 424. Egress lookup controller 424 queries egress memory controller 216 and, therefore, memory 114 for the key information. Upon receipt of the key information, decrypt 408 compares the BPI sequence number in the signal header with the stored key information, and decrypts the signal based on the key information Decrypt 408 then passes the signal to UGS detector 412 with information specifying whether there is a mismatch.

On receipt, UGS detector 412 checks the signal for a UGS extended header. If found, UGS detector 412 queries egress lookup controller 424 for a UGS header value retrieved with the key information requested by decrypt 408. UGS detector 412 compares the UGS extended header with the UGS header value. If the two UGS headers do not match, UGS detector 412 sends a write request to memory 114 to update the stored UGS header value. An example of a method and system for checking a UGS extended header are described in the application entitled "Hardware Filtering of Unsolicited Grant Service Extended Headers" (U.S. App No. 60/324,912), which is incorporated herein by reference as though set forth in its entirety. Irrespective, UGS detector 412 passes the signal to HDR processor 416 and informs HDR processor 416 whether the two UGS headers match.

HDR processor 416 processes headers from the signals to extract requests. An exemplary process for extracting signals for sending on an alternative path is described in the application entitled "Method and Apparatus for the Reduction of Upstream Request Processing Latency in a Cable Modem Termination System" (U.S. App No. 09/652,718), which is incorporated herein by reference as though set forth in its entirety. HDR processor 416 sends the requests to request queue DMA 428. HDR processor 416 also forwards to request queue DMA 428 any information relating to mismatches detected in the UGS extended header and/or decryption key sequence number. Request queue DMA 428 accumulates the requests, UGS extended header mismatches, and/or decryption key sequence number mismatches from all six upstream channels, and sends the information to egress memory controller 216 for delivery to a request upstream egress queue located in memory 114.

HDR processor 416 delivers the data and/or voice payloads to burst DMA 420. In an embodiment, HDR processor 416 performs deconcatenation on the payload frames prior to sending the frames to burst DMA 420. Burst DMA 420 sends the payload frames to egress memory controller 216 for delivery to queues in memory 114.

As discussed, egress lookup controller 424 performs lookup operations by querying memory 114 (via egress memory controller 216) to retrieve BPI key information, and check BPI key sequence number for mismatches. Egress lookup controller 424 also retrieves UGS extended header information, and compares the information to the UGS extended header in the current signal for mismatches.

Figure 5:
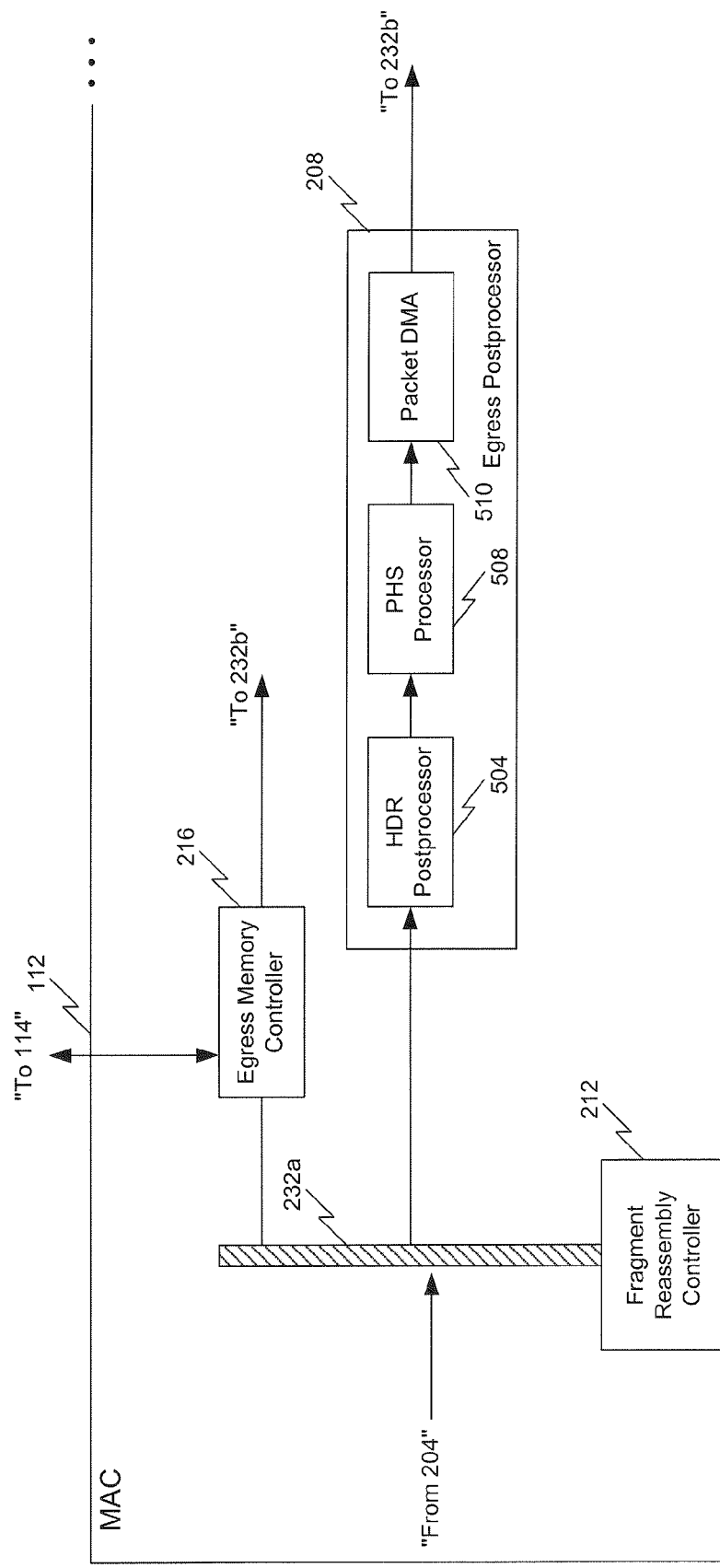
FIG. 5 illustrates an egress postprocessor according to an embodiment of the present invention.

FIG. 5 shows the components of egress postprocessor 208 according to an embodiment of the present invention. Egress postprocessor 208 includes a HDR postprocessor 504, a payload header suppression/expansion (PHS) processor 508, and packet DMA 510.

HDR postprocessor 504 evaluates the reassembled fragmented frames and performs deconcatenation, as required. PHS processor 508 fetches the relevant PHS rules to expand payload header suppressed packets. In an embodiment, PHS processor 508 expands packets suppressed according to DOCSIS Payload Header Suppression. In another embodiment, PHS processor 508 expands packets suppressed by the Propane™ PHS technology available from Broadcom Corporation of Irvine, Calif.

Packet DMA 510 receives the frame from PHS processor 508. Packet DMA 510 sends the processed frames to egress memory controller 216 for delivery to output queues in memory 114.

Figure 6:
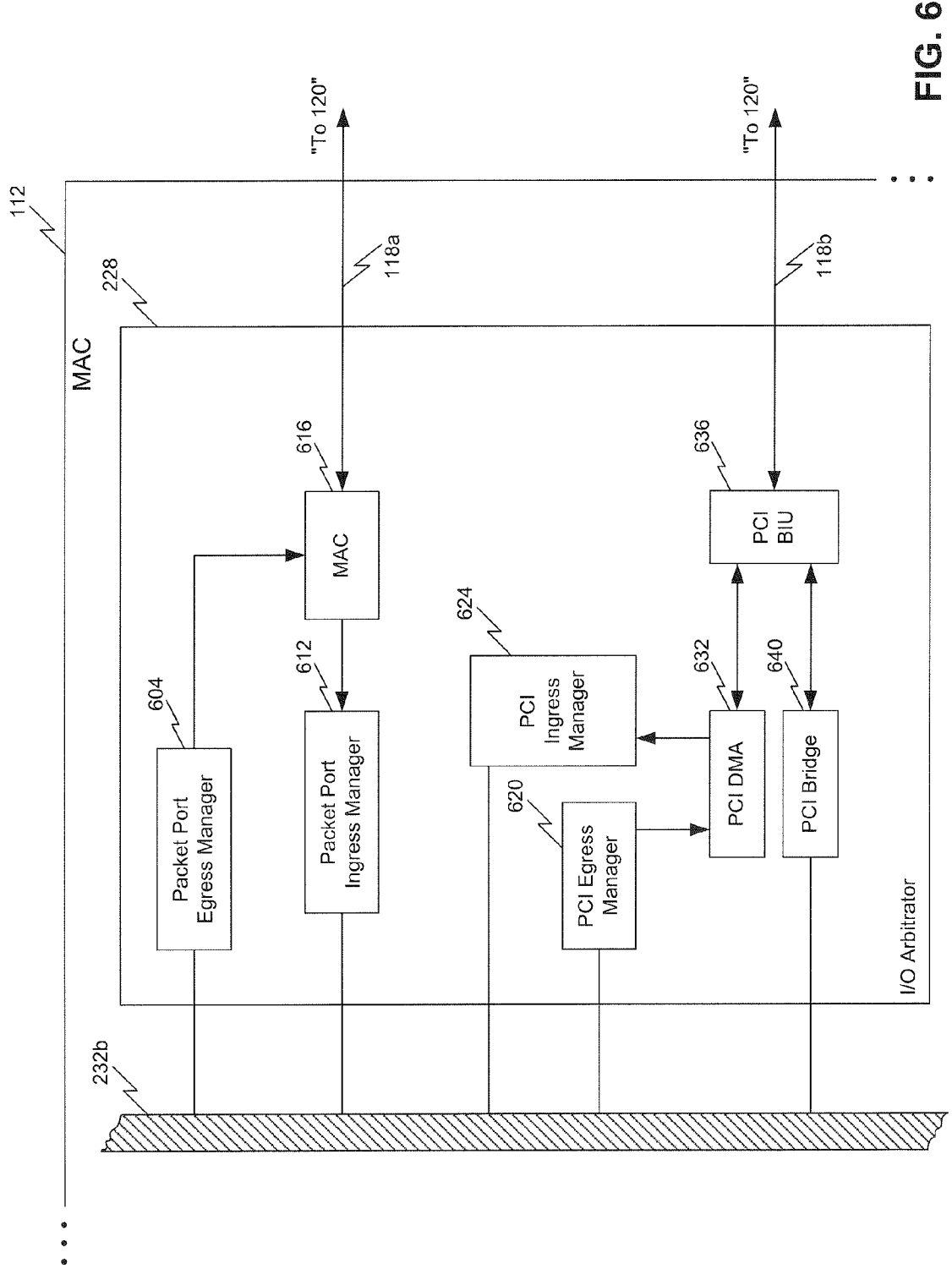
FIG. 6 illustrates an I/O arbitrator according to an embodiment of the present invention.

FIG. 6 shows the components of I/O arbitrator 228 according to an embodiment of the present invention. I/O arbitrator 228 enables signals to be exchanged over a packet port 118*a* and a PCI port 118*b*.

Packet port 118*a* interacts with a MAC 616, packet port ingress manager 612, and a packet port egress manager 604. In an embodiment, MAC 616 is configured to support an Ethernet data interface. However, MAC 161 can be any other type of high-speed data interface for moving packets in and out of MAC 112.

Packet port egress manager 604 arbitrates among the upstream priority queues destined for packet port 118*a*. More specifically, memory 114 includes packet port-destined, upstream priority queues. Packet port egress manager 604 interacts with egress memory controller 216 to retrieve packets from the upstream priority queues, and deliver the data to MAC 616. MAC 616 delivers the signal to packet port 118*a* over a gigabit media independent interface (GMII interface). It should be understood that a GMII interface is provided by way of example. In alternative embodiments, MAC 616 delivers the signal over other types of interfaces.

MAC 616 also receives signals from packet port 118*a*, and delivers them to packet port ingress manager 612. Packet port ingress manager 612 sends the signals to ingress memory controller 220 to store the signals in downstream priority queues in memory 114. In an embodiment, the downstream signals are stored according to a DET tag specified in the signals. An example of a method and system for packet tag processing are described in the application entitled "Packet Tag for Support of Remote Network Function/Packet Classification" (U.S. application Ser. No. 10/032,100), which is incorporated herein by reference as though set forth in its entirety.

PCI port 118*b* interacts with a PCI bus interface unit (BIU) 636, a PCI DMA 632, a PCI bridge 640, a PCI egress manager 620, and a PCI ingress manager 624. PCI egress manager 620 arbitrates among the upstream priority queues destined for packet port 118*b*. More specifically, memory 114 includes PCI-destined, upstream priority queues. PCI egress manager 620 interacts with egress memory controller 216 to retrieve packets from the upstream priority queues, and deliver the data to PCI DMA 632.

PCI ingress manager 624 receives downstream signals brought into MAC 112 by PCI DMA 632. PCI ingress manager 624 sends them to ingress memory controller 220 to store the signals in downstream priority queues in memory 114. In an embodiment, the downstream signals are stored according to a PCI descriptor specified in the signals.

PCI DMA 632 acts as a PCI master to move data between MAC 112 and software application 120. PCI DMA 632 interacts with PCI BIU 636 which interfaces with the physical layer of 118*b*.

PCI bridge 640 processes all PCI transactions where MAC 112 is the target of the transaction. All accesses by software application 120 to the PCI registers or PCI memories of MAC 112 pass through PCI bridge 640.

Figure 7:
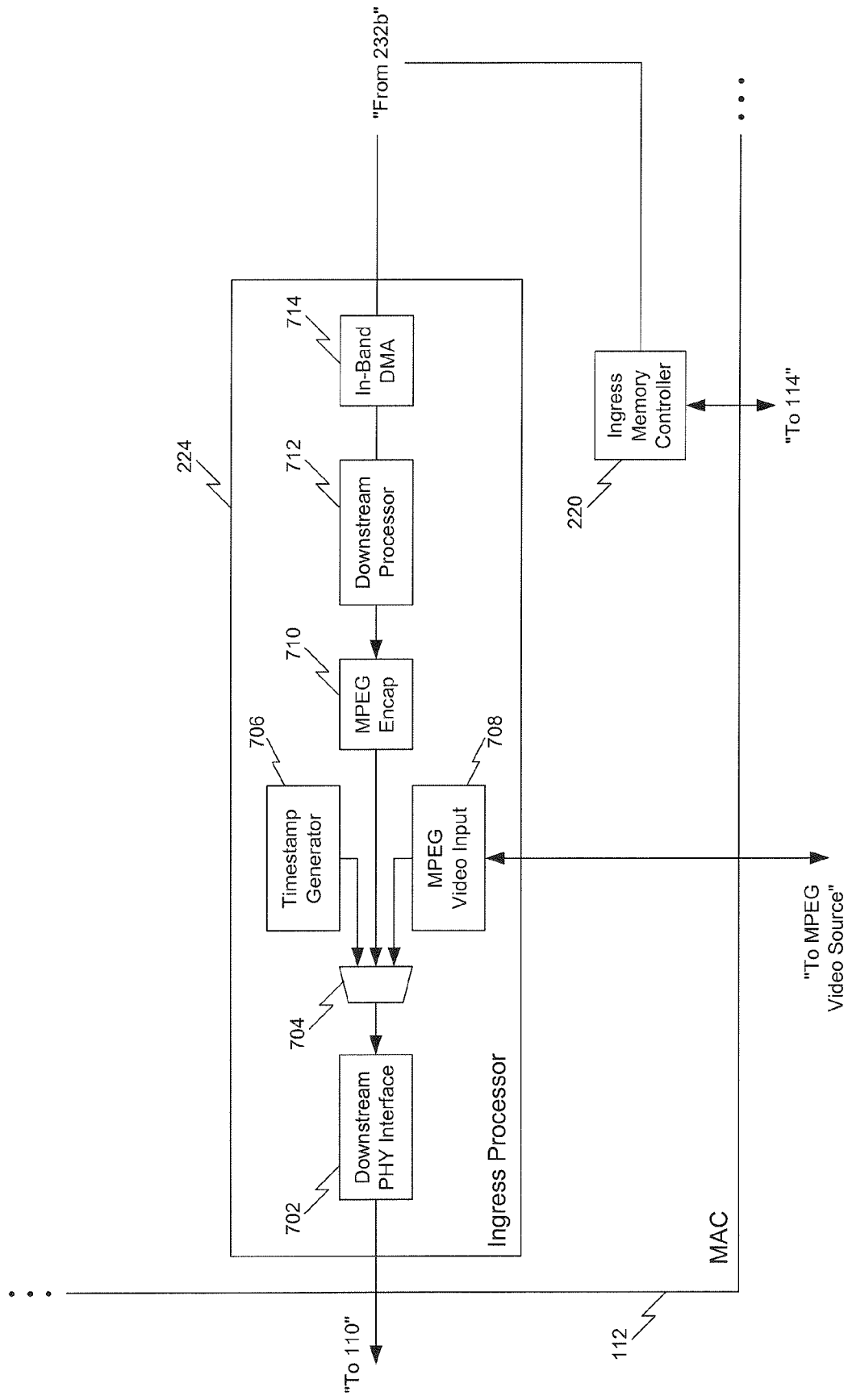
FIG. 7 illustrates a media access controller according to another embodiment of the present invention.

FIG. 7 shows the components of ingress processor 224 according to an embodiment of the present invention. Ingress processor 224 includes a downstream PHY I/F 702, a multiplexer (MUX) 704, a timestamp generator 706, a MPEG video input 708, a MPEG encapsulator 710, a downstream processor 712, and an in-band DMA 714.

In-band DMA 714 interfaces with bus 232*b* to interact with other components of MAC 112. For instance, in-band DMA 714 interacts with ingress memory controller 220 to retrieve downstream signals from the downstream priority queues of memory 114. In-band DMA 714 also interacts with ingress memory controller 220 to fetch PHS rules and DES keys from memory 114, as needed by other components of ingress processor 224.

Downstream processor 712 receives signals from in-band DMA 714. As described in further detail below, downstream processor 712 processes and/or formats the signals to be transmitted downstream to a destined remote communications node 102.

Timestamp generator 706, MPEG encapsulator 710, and MPEG video input 708 perform DOCSIS downstream transmission convergence sublayer functions. Specifically, MPEG encapsulator 710 receives the signals from downstream processor 712, and performs MPEG encapsulation. Timestamp generator 706 provides timestamp message generation. Additionally, MPEG video input 708 receives MPEG video frames, if so configured. An example of a method and system for interleaving MPEG video frames with data are described in the application entitled "Method and Apparatus for Interleaving DOCSIS Data with an MPEG Video Stream" (U.S. application Ser. No. 09/963,670), which is incorporated herein by reference as though set forth in its entirety.

MUX 704 receives and multiplexes the MPEG-formatted signals, timestamps and MPEG video frames. MUX 704 delivers the MPEG frames to downstream PHY I/F 702. Downstream PHY I/F 702 delivers the MPEG frames to the external DS PHY 110.

Figure 8:
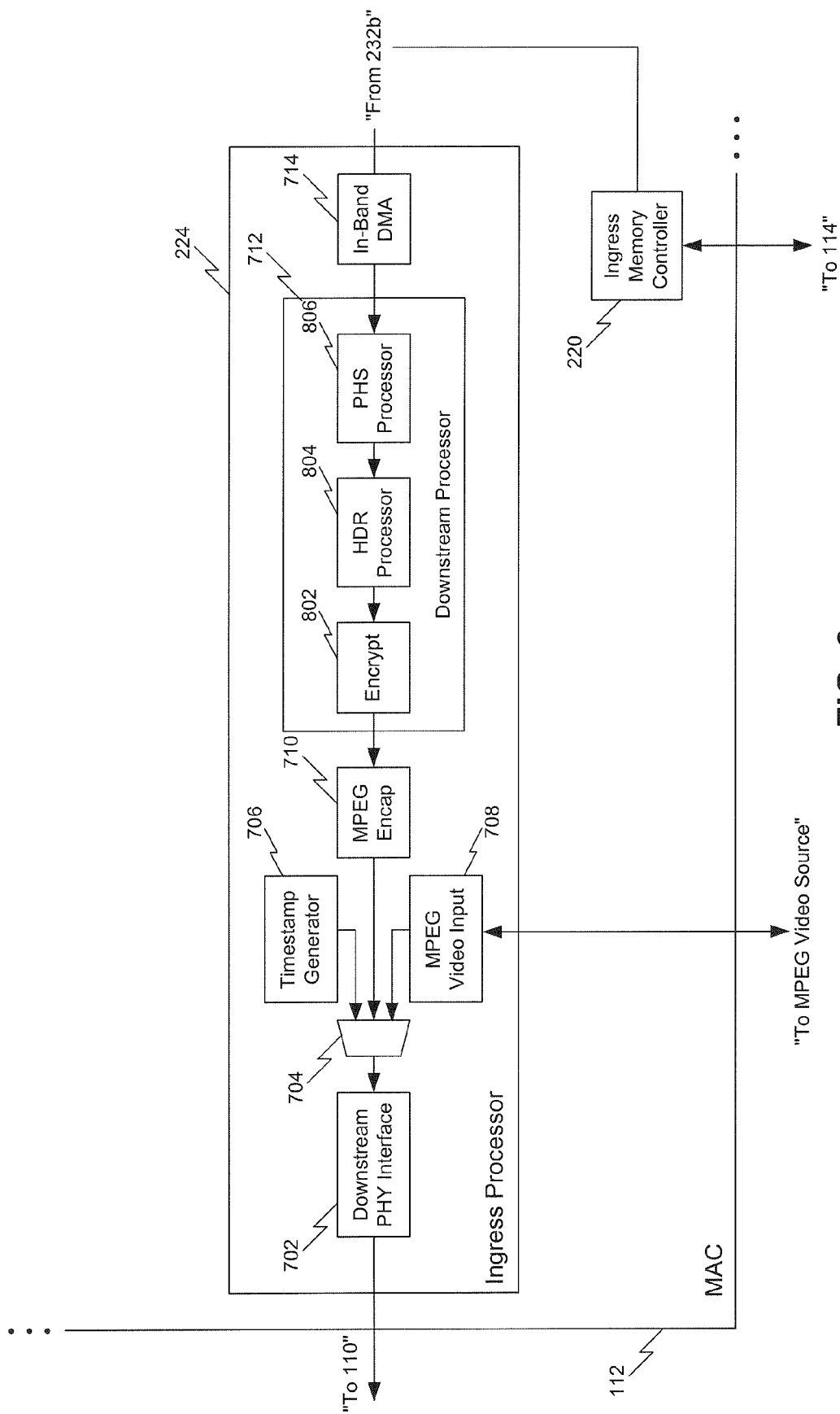
FIG. 8 illustrates an ingress processor according to an embodiment of the present invention.

As intimated, downstream processor 712 receives the downstream signals from in-band DMA 714, and processes the signals according to various DOCSIS protocols, such as header creation, header suppression, and/or encryption. FIG. 8 shows an alternative embodiment of ingress processor 224 that includes another embodiment of downstream processor 712. In this embodiment, downstream processor 712 includes an encryptor 802, a HDR processor 804, and a PHS processor 806.

PHS processor 806 receives the downstream signals and fetches the relevant PHS rules to suppress the packet headers. In an embodiment, PHS processor 806 performs DOCSIS Payload Header Suppression as specified by a downstream PCI descriptor or Packet Port DET tag from the signal.

HDR processor 804 receives the signals from PHS processor 806 and creates a DOCSIS header. The header is created according to a downstream PCI descriptor or Packet Port DET tag stored with the signal. HDR processor 804 also generates HCS and/or CRC fields for error detection. A CRC field is always generated when PHS is performed.

Encryptor 802 performs DES encryption on the signals from HDR processor 804. If a BPI security protocol is being used, encryptor 802 fetches DES keys to perform encryption.

Figure 9:
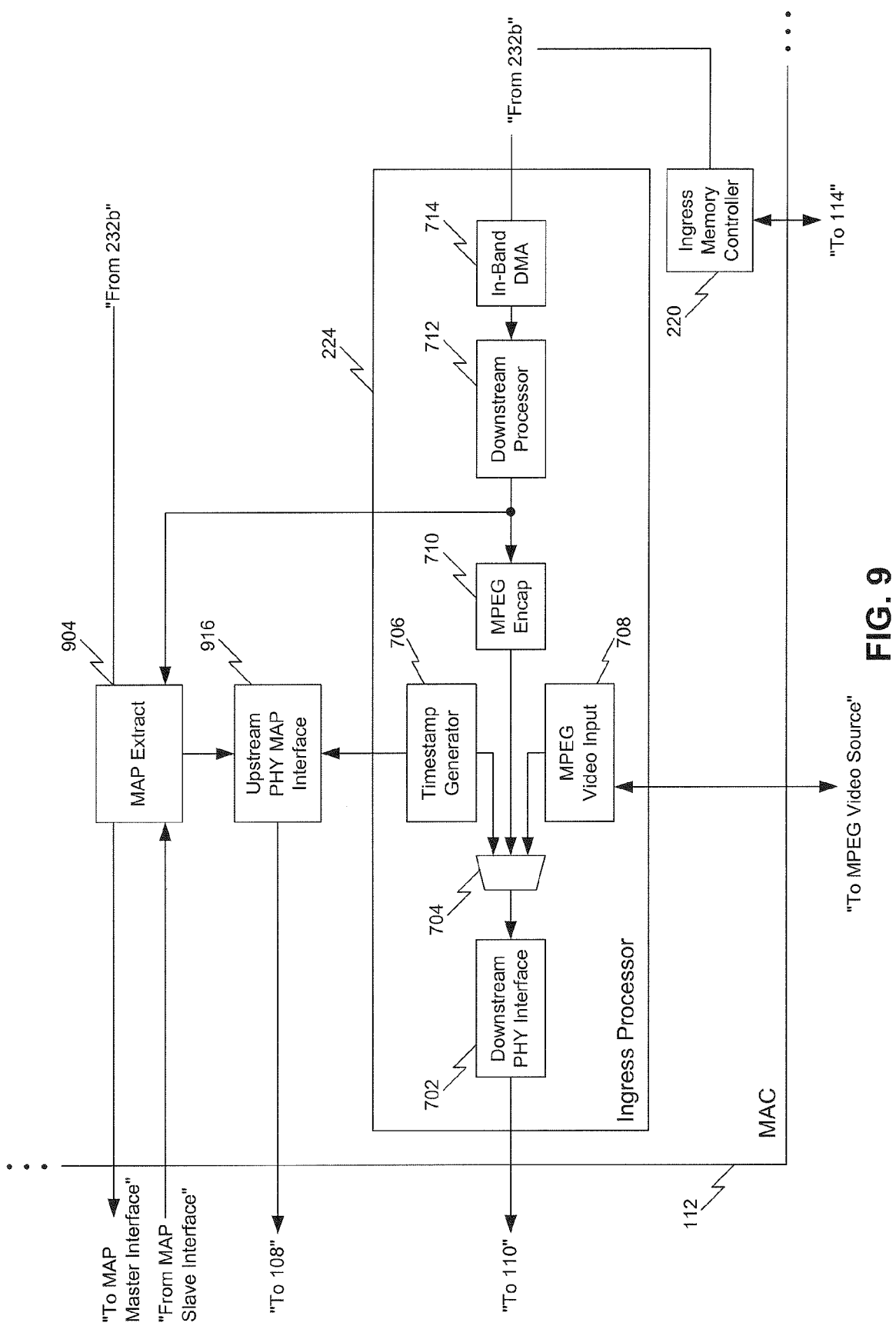
FIG. 9 illustrates an ingress processor, MAP extract, and PHY MAP interface according to another embodiment of the present invention.

FIG. 9 shows another embodiment of MAC 112 that includes a MAP extract 904 and an upstream PHY MAP interface 916. More specifically, FIG. 9 illustrates the interaction between ingress processor 224, MAP extract 904 and upstream PHY MAP interface 916. In an embodiment, MAP extract 904 monitors the downstream signals as they are being processed within ingress processor 224. As described above, the downstream signals include data and/or voice packets, control messages, or the like. The control messages include MAP messages intended for remote communications node(s) 102. The MAP messages, like other types of downstream signals, are delivered to MPEG encapsulator 710 for additional downstream formatting and subsequent transmission to the designated remote communications node(s) 102, as previously discussed.

If, during the monitoring operations of MAP extract 904, MAP messages are detected, MAP extract 904 receives the MAP messages from the downstream path controlled by ingress processor 224. MAP extract 904 processes and/or forwards the MAP messages according to various protocols. Primarily, the MAP messages are delivered to upstream PHY MAP interface 916. Upstream PHY MAP interface 916 interacts with timestamp generator 706 to receive timing information that is included with the MAP message. Subsequently, upstream PHY MAP interface 916 passes this information to US PHY 108. US PHY 108 uses this information, which includes slot assignments, boundaries, and timing, to plan for the arrival of upstream bursts.

MAP extract 904 is also connected to a master-slave interface that enables MAC 112 to operate in a master or slave mode. An example of a MAC capable of operating in master or slave mode is described in the application entitled "Method and System for Flexible Channel Association" (U.S. application Ser. No. 09/963,671), which is incorporated herein by reference as though set forth in its entirety.

In master mode, MAC 112 provides MAP messages to other slave devices to control their upstream channels. As such, MAP extract 904 detects MAP messages from ingress processor 224 and send to the slave devices. These MAP messages are transported out the MAP Master interface to the slave devices.

Conversely, MAC 112 is operable to function in slave mode. As such MAP extract 904 receives MAP messages from a Master MAC 112 (not shown) from the MAP Slave interface. Additionally, the MAP messages are delivered to upstream PHY MAP interface 916, so that US PHY 108 can plan for the arrival of the associated upstream bursts. Hence, MAP extract 904 parses MAP messages from both the downstream path of ingress processor 224 and the MAP Slave interface.

Figure 10:
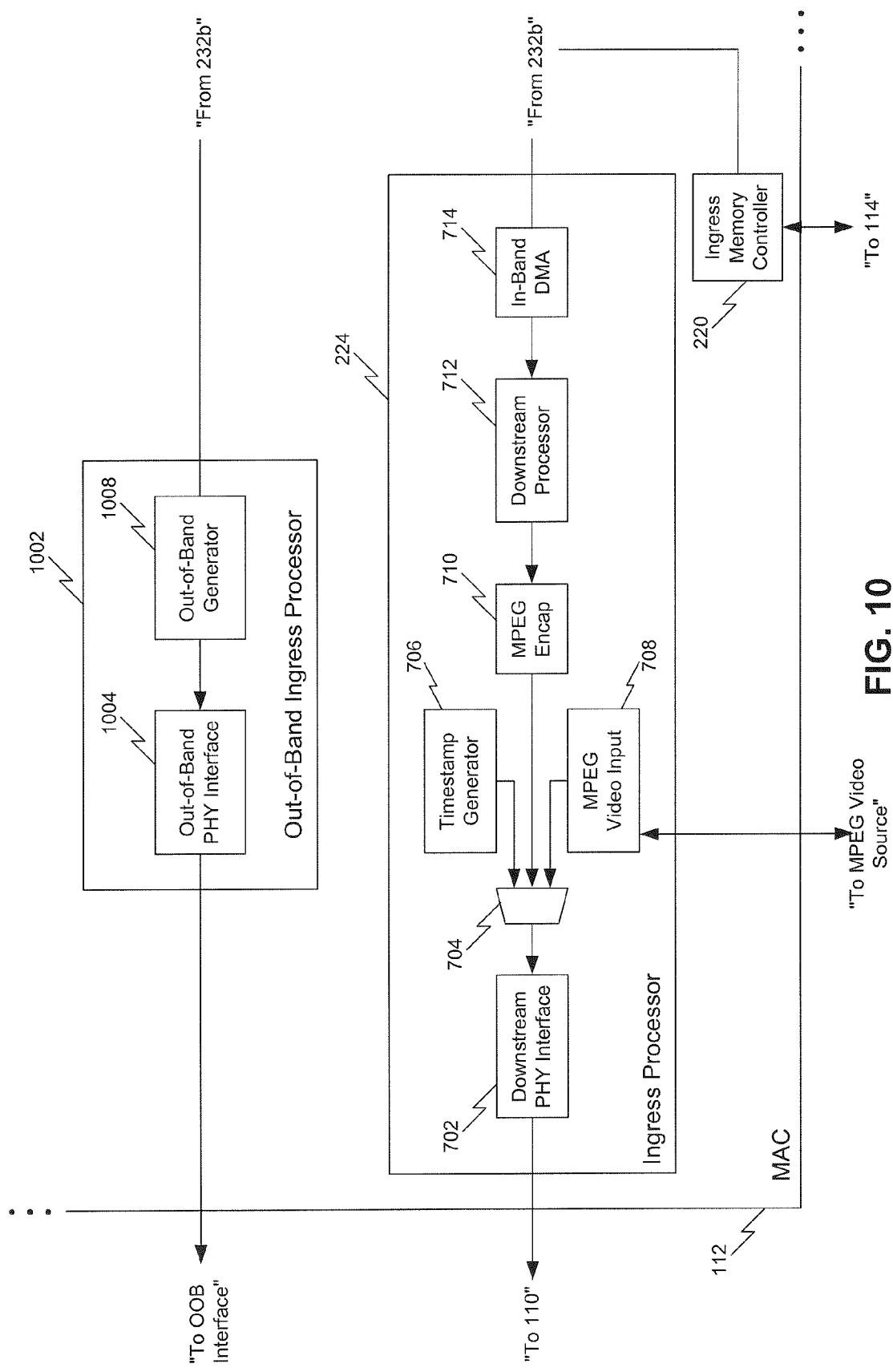
FIG. 10 illustrates an OOB ingress processor according to another embodiment of the present invention.

FIG. 10 shows another embodiment of MAC 112 that includes an outof-band (OOB) ingress processor 1002. OOB ingress processor 1002 includes an OOB PHY I/F 1004, and an OOB generator 1008.

OOB generator 1008 interacts with ingress memory controller 220 over bus 232b to retrieve signals from a downstream OOB queue located in memory 114. On receipt of the OOB signals, OOB generator 1008 performs protocol operations as specified by a downstream PCI descriptor or Packet Port DET tag include with the signal. OOB PHY I/F 1004 receives the signal from OOB generator 1008, and delivers the signal to an external OOB PHY device (not shown) over an OOB interface.

Figure 11:
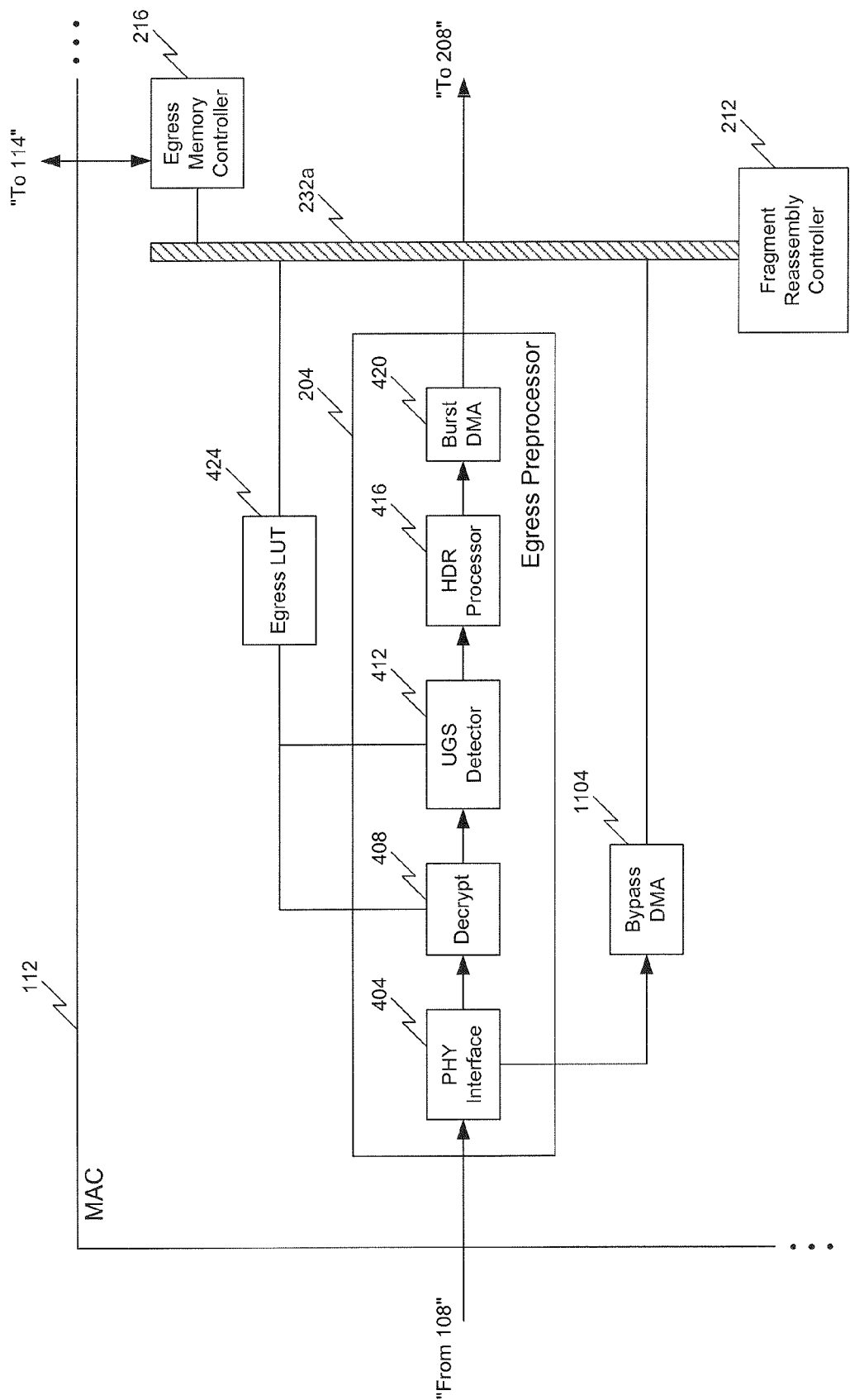
FIG. 11 illustrates a media access controller with a bypass DMA according to an embodiment of the present invention.

FIG. 11 shows another embodiment of MAC 112 that includes a bypass DMA 1104. PHY I/F 404 detects signals having a bypass field enabled and forwards the signals directly to bypass DMA 114. Bypass DMA 114 interacts with egress memory controller 216 to deliver the bypass signals, exactly as received, to bypass upstream egress queues located in memory 114. Signals delivered to the bypass upstream egress queues via this path do not undergo DOCSIS processing of any kind. Bypass DMA 114 can be used, for example, for testing and/or debugging. In an embodiment, signals are sampled and tested and/or debugged per SID at a periodically programmable rate.

Figure 12:
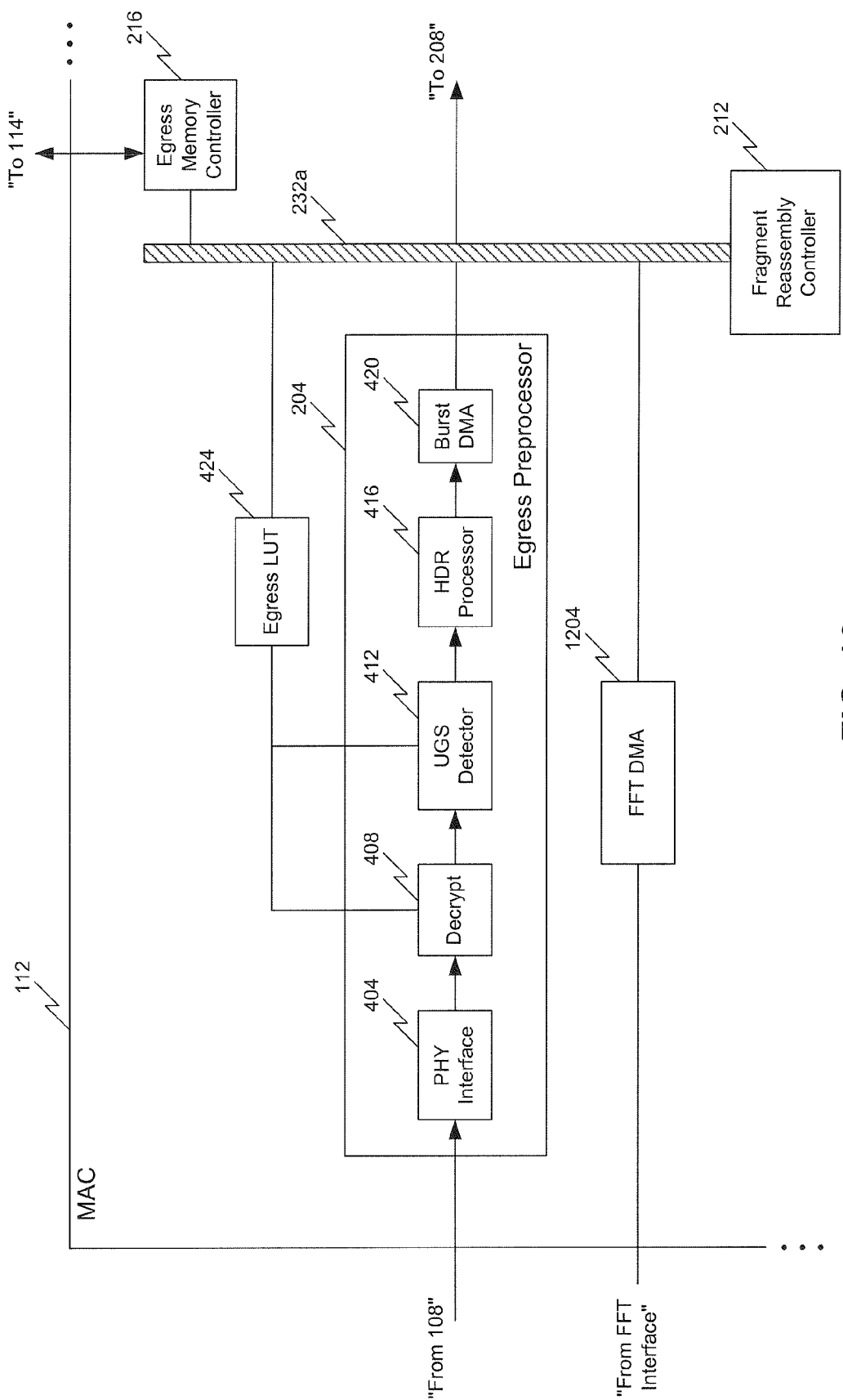
FIG. 12 illustrates a media access controller with FFT DMA according to an embodiment of the present invention.

FIG. 12 shows another embodiment of MAC 112 that includes a FFT DMA 1204. FFT DMA 1204 receives FFT signals from an external upstream PHY device (not shown) on a FFT interface. FFT DMA 1204 interacts with egress memory controller 216 to deliver the FFT signals to FFT upstream egress queues located in memory 114.

Figure 13:
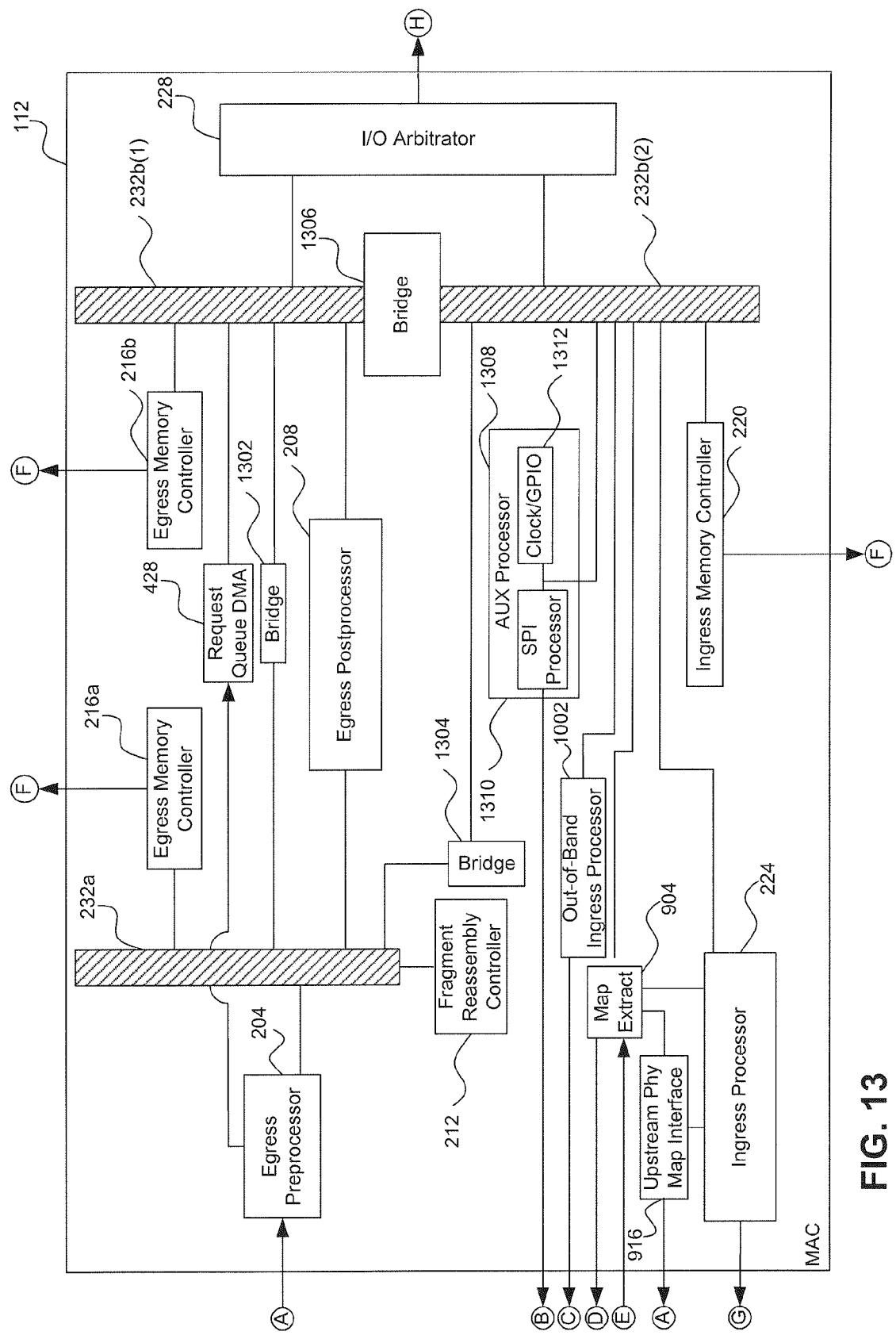
FIG. 13 illustrates a media access controller according to another embodiment of the present invention.

FIG. 13 shows another embodiment of MAC 112 that includes several components described in FIGS. 2-12 above. Reference characters "A-H" illustrate the interaction between MAC 112 and other components of supervisory communications node 106. Accordingly in FIG. 13, reference character "A" illustrates US PHY 108, "B" illustrates a SPI interface as described below, "C" illustrates an OOB interface as described above, "D" illustrates a MAP master interface as described above, "E" illustrates a MAP slave interface as described above, "F" illustrates memory 114, "G" illustrates DS PHY 110, and "H" illustrates software application 120.

Bus 232b is shown in FIG. 13 as bus 232b(1) and bus 232(b)(2). Bus 232b(1) arbitrates communication of upstream signals that have been processed by egress postprocessor 208. Bus 232b(2) arbitrates communication of downstream signals with ingress processor 224 and OOB ingress processor 1002.

Several bus bridges are provided to enable the components to use the other buses, as required. Bus 0-1 bridge 1302 provides interconnectivity between bus 232a and bus 232b(1). Bus 0-2 bridge 1304 provides interconnectivity between bus 232a and bus 232b(2). Bus 1-2 bridge 1306 provides interconnectivity between bus 232b(1) and 232b(2). These bridges allow communication between components on different bus segments.

Auxiliary processor 1308 is included to enable additional features, including a serial peripheral interface (SPI) processor 1310 and a clock/GPIO 1312. SPI processor 1310 receives and/or transmits signals over a SPI port that allows for enhanced inputs and outputs. Clock/GPIO 1312 supports synchronization and/or reset operations.

As discussed above, MAC 112, in embodiments, is a single integrated circuit. As such, each component of MAC 112, as described above with reference to FIGS. 2-13, is formed on or into a single microchip that is mounted on a single piece of substrate material, printed circuit board, or the like. In an embodiment, one or more components of MAC 112 are formed on or into a distinct secondary circuit chip (also referred to as a "daughter chip"), and later mounted on a primary integrated circuit chip. Thus, the primary chip is a single package containing all components of MAC 112, which includes one or more daughter chips.

Referring back to FIG. 1, US PHY 108, DS PHY 110, and MAC 112 are shown as separate components of supervisory communications node 106. However, in embodiments of the present invention (not shown), US PHY 108 and DS PHY 110 are components of MAC 112. Therefore, US PHY 108 and DS PHY 110 are integrated into the single integrated circuit containing the other components of MAC 112.

It should be understood that although only one memory 114 is shown in FIG. 1, the present invention is adaptable to support multiple memories. In an embodiment, memory 114 includes two upstream SDRAMs and one downstream SDRAMs. However, each upstream SDRAM primarily is used for distinct operations. For instance, one upstream SDRAM interfaces with egress memory controller 216a and stores signals and/or auxiliary information to support the operations of egress preprocessor 204, fragment reassembly 212, egress postprocessor 208, bypass DMA 1104 and/or FFT DMA 1204. The second upstream SDRAM, for example, interfaces with egress memory controller 216b and stores signals and/or auxiliary information to support the operations of request queue DMA 428, egress postprocessor 208, and/or I/O arbitrator 228.

The downstream SDRAM primarily stores downstream signals and auxiliary information to support the operations of I/O arbitrator 228, ingress processor 224, MAP extract 904, OOB ingress processor 1002, and/or auxiliary processor 1308.

As discussed, the bus bridges (1302, 1304, and 1306) allow communication between components on different bus segments. For instance, bus 0-1 bridge 1302 enables the use of a single egress memory controller 216 to access a single upstream SDRAM (i.e., memory 114). In another example, the bus bridges are used to allow the PCI target bridge 640 to access registers from components connected to bus 232a and/or bus 232b.

In an embodiment, memory 114 collects egress and ingress statistics to support DOCSIS OSSI Management Information Base (MIB) requirements. MAC 112 and memory 114 gather and store statistics per SID and/or on a particular channel or link. The statistics include the quantity of bits/bytes received, the quantity of packets received, the quantity of HCS errors, the quantity of CRC errors, and the like.

As discussed, memory 114 of the present invention include various distinct queues used to support the enhanced operations of MAC 112. The queues include a DOCSIS high priority queue based on SID lookup, and/or a DOCSIS low priority queue based on SID lookup. An example of SID-lookup priority queues is described in the application entitled "Method and System for Upstream Priority Lookup at Physical Interface" (U.S. application Ser. No. 09/963,689), which is incorporated herein by reference as though set forth in its entirety. Other priority queues of the present invention include a ranging messages queue, a non-ranging management messages queue, a bypass DMA queue, a requests queue, a FFT queue, and/or a pass-through queue (e.g., a PCI-to-Packet Port queue, and/or a Packet Port-to-PCI queue). The above nine queues are not intended to be exclusive. As would be apparent to one skilled in the relevant art(s), additional or fewer queues, memories, and/or memory controllers can be implemented and are considered to be within the scope of the present invention.

III. Conclusion

FIGS. 1-13 are conceptual illustrations that allow an easy explanation of the present invention. That is, the same piece of hardware or module of software can perform one or more of the blocks. It should also be understood that embodiments of the present invention can be implemented in hardware, software, or a combination thereof. In such an embodiment, the various components and steps would be implemented in hardware and/or software to perform the functions of the present invention.

While various embodiments of the present invention have been described above, it should be understood that they have been presented by way of example, and not limitation. It will be apparent to persons skilled in the relevant art(s) that various changes in foam and detail can be made therein without departing from the spirit and scope of the invention. Moreover, it should be understood that the method and system of the present invention should not be limited to transmissions between cable modems and headends. The present invention can be implemented in any multi-nodal communications environment governed by a centralized node. The nodes can include communication gateways, switches, routers, Internet access facilities, servers, personal computers, enhanced telephones, personal digital assistants (PDA), televisions, set-top boxes, or the like. Thus, the present invention should not be limited by any of the above-described exemplary embodiments, but should be defined only in accordance with the following claims and their equivalents.

What is claimed is:

1. An apparatus to process an egress signal within a media access controller integrated circuit (MAC IC), comprising:
an egress postprocessor configured to process a frame of data, the egress postprocessor comprising:
a header postprocessor configured to deconcatenate a header from the frame of data,
a payload header suppression/expansion (PHS) processor configured to expand a payload header suppressed packet from the header based upon one or more PHS rules to provide an expanded frame of data, and
a packet direct memory access (DMA) module configured to send the expanded frame of data for storage in a memory.

2. The apparatus of claim 1, further comprising:
an egress memory controller configured to receive the expanded frame of data and to deliver the expanded frame of data to the memory.

3. The apparatus of claim 2, further comprising:
an input/output (I/O) arbitrator configured to receive the expanded frame of data from the memory and to provide the expanded frame of data to a software application.

4. The apparatus of claim 1, wherein the header postprocessor is further configured to receive the frame of data from a first bus, and wherein the packet DMA module is further configured to send the expanded frame of data over a second bus to be stored in the memory, the first bus being different from the second bus.

5. The apparatus of claim 1, wherein the PHS processor is further configured to expand the payload header suppressed packet according to Data Over Cable Service Interface Specification (DOCSIS) Payload Header Suppression.

6. An apparatus to process an egress signal within a media access controller integrated circuit (MAC IC), comprising:
a fragment reassembly controller configured to identify a fragmented frame from a payload of the egress signal and to reassemble one or more fragmented frames to provide a frame of data; and
an egress postprocessor configured to process the frame of data, the egress postprocessor comprising:
a header postprocessor configured to deconcatenate a header from the frame of data, and
a payload header suppression/expansion (PHS) processor configured to expand a payload header suppressed packet from the header based upon one or more PHS rules to provide an expanded frame of data.

7. The apparatus of claim 6, further comprising:
an egress pre-processor configured to perform preliminary signal processing on the egress signal to provide the payload.

8. The apparatus of claim 6, further comprising:
an egress memory controller configured to deliver the frame of data to a memory and to provide the frame of data from the memory to the header postprocessor.

9. The apparatus of claim 1, wherein the PHS processor is further configured to receive the one or more PHS rules from the memory.

10. A method for processing an egress signal within a media access controller integrated circuit (MAC IC), comprising:
(a) deconcatenating, by the MAC IC, a header from a frame of data;
(b) expanding, by the MAC IC, a payload header suppressed packet from the header based upon one or more payload header suppression/expansion (PHS) rules to provide an expanded frame of data; and
(c) sending, by the MAC IC, the expanded frame of data for storage in a memory.

11. The method of claim 10, further comprising:
(d) receiving, by the MAC IC, the expanded frame of data; and
(e) delivering, by the MAC IC, the expanded frame of data to the memory.

12. The method of claim 11, further comprising:
(f) receiving, by the MAC IC, the expanded frame of data from the memory; and
(g) providing, by the MAC IC, the expanded frame of data to a software application.

13. The method of claim 10, wherein step (a) comprises:
(a)(i) receiving, by the MAC IC, the header from a first bus, and
wherein step (c) comprises:
(c)(i) sending, by the MAC IC, the expanded frame of data over a second bus for storage in the memory, the first bus being different from the second bus.

14. The method of claim 10, wherein step (b) comprises:
(b)(i) expanding, by the MAC IC, the payload header suppressed packet according to Data Over Cable Service Interface Specification (DOCSIS) Payload Header Suppression.

15. A method for processing an egress signal within a media access controller integrated circuit (MAC IC), comprising:
(a) deconcatenating, by the MAC IC, a header from a frame of data;
(b) expanding, by the MAC IC, a payload header suppressed packet from the header based upon one or more payload header suppression/expansion (PHS) rules to provide an expanded frame of data; and
(c) identifying, by the MAC IC, a fragmented frame from a payload of the egress signal and to reassemble one or more fragmented frames to provide the frame of data.

16. The method of claim 15, further comprising:
(d) performing, by the MAC IC, preliminary signal processing on the egress signal to provide the payload.

17. The method of claim 15, further comprising:
(d) delivering, by the MAC IC, the frame of data to a memory; and
(e) providing, by the MAC IC, the frame of data from the memory to the header postprocessor.

18. The method of claim 10, wherein step (b) comprises:
(b)(i) receiving the one or more PHS rules from the memory.

* * * * *